United States Patent
Inoue et al.

(10) Patent No.: US 11,478,392 B2
(45) Date of Patent: Oct. 25, 2022

(54) MEDICAL DEVICE

(71) Applicant: MIZUHO Corporation, Tokyo (JP)

(72) Inventors: Akihisa Inoue, Sakura (JP); Tomoya Nakakuki, Sakura (JP); Takuya Obi, Sakura (JP)

(73) Assignee: MIZUHO Corporation, Tokyo (JP)

( * ) Notice: Subject to any disclaimer, the term of this patent is extended or adjusted under 35 U.S.C. 154(b) by 56 days.

(21) Appl. No.: 16/488,799

(22) PCT Filed: Feb. 27, 2017

(86) PCT No.: PCT/JP2017/007334
§ 371 (c)(1),
(2) Date: Aug. 26, 2019

(87) PCT Pub. No.: WO2018/154750
PCT Pub. Date: Aug. 30, 2018

(65) Prior Publication Data
US 2020/0060916 A1   Feb. 27, 2020

(51) Int. Cl.
*A61G 13/10* (2006.01)
*A61G 13/08* (2006.01)
(Continued)

(52) U.S. Cl.
CPC .............. *A61G 13/10* (2013.01); *A61G 13/08* (2013.01); *B60B 33/0089* (2013.01);
(Continued)

(58) Field of Classification Search
CPC ...... A61G 13/10; A61G 13/08; A61G 13/104; A61G 13/02; A61G 2203/16;
(Continued)

(56) References Cited

U.S. PATENT DOCUMENTS 2,830,304 A * 4/1958 Ericsson ................. A61G 7/08
                                                           5/11
3,713,129 A * 1/1973 Buchholz ............. B66C 23/905
                                                         340/517
(Continued)

FOREIGN PATENT DOCUMENTS

| JP | 53-22361 Y2 | 6/1978 |
| JP | 3081361 U | 11/2001 |
| JP | 2004-073616 A | 3/2004 |
| JP | 2009-034501 A | 2/2009 |
| JP | 2013-148520 A | 8/2013 |

(Continued)

OTHER PUBLICATIONS

International Search Report for PCT/JP2017/007334 dated Mar. 28, 2017.

*Primary Examiner* — Eric J Kurilla
*Assistant Examiner* — Morgan J McClure
(74) *Attorney, Agent, or Firm* — Sughrue Mion, PLLC (57) ABSTRACT

Medical device capable of properly measuring a center of gravity and capable of preventing overturning of a surgical operation table is provided without performing a significant design change. Medical device S, which includes a plurality of leg portions 20 that lift up a main body 2 from a floor surface and support the main body 2, includes load detection devices 55 that are provided between the main body 2 and the respective leg portions 20, and detect loads in a vertical direction received by the leg portions 20 from the floor surface.

5 Claims, 8 Drawing Sheets

(51) Int. Cl.
*B60B 33/00* (2006.01)
*B60B 33/06* (2006.01)
*G01G 19/52* (2006.01)
*A47B 91/02* (2006.01)

(52) U.S. Cl.
CPC ......... *A47B 91/02* (2013.01); *A47B 2220/003* (2013.01); *A61G 2203/16* (2013.01); *A61G 2203/44* (2013.01); *B60B 33/06* (2013.01); *B60B 2200/22* (2013.01); *G01G 19/52* (2013.01)

(58) Field of Classification Search
CPC .............. A61G 2203/44; A61G 7/1046; B60B 33/0089; B60B 2200/242; B60B 33/06; B60B 33/04; B60B 33/063; B60B 2200/24; B60B 2200/22; G01G 19/52; G01G 19/025; G01G 19/027; A47B 2220/003; A47B 91/02; A47B 91/16; A47B 91/12
See application file for complete search history.

(56) References Cited

U.S. PATENT DOCUMENTS

| | | | | |
|---|---|---|---|---|
| 4,669,136 | A * | 6/1987 | Waters | A61G 7/00 177/144 |
| 5,823,278 | A * | 10/1998 | Geringer | G01G 19/52 177/144 |
| 5,831,221 | A * | 11/1998 | Geringer | G01G 19/52 177/144 |
| 5,861,582 | A * | 1/1999 | Flanagan | G01G 3/13 177/144 |
| 6,678,907 | B1 * | 1/2004 | Voelker | A61G 7/012 5/11 |
| 6,680,442 | B1 * | 1/2004 | Rynd | G01G 19/445 177/140 |
| 7,232,962 | B2 * | 6/2007 | Rynd | G01G 19/445 177/140 |
| 2009/0031497 | A1 * | 2/2009 | Meissner | A61G 13/10 5/607 |
| 2019/0357680 | A1 * | 11/2019 | Timenes | F16M 3/00 |

* cited by examiner

MEDICAL DEVICE

CROSS REFERENCE TO RELATED APPLICATIONS

This application is a National Stage of International Application No. PCT/JP2017/007334 filed Feb. 27, 2017.

TECHNICAL FIELD

The present invention relates to medical device, and particularly relates to an overturning prevention mechanism of a surgical operation table.

BACKGROUND ART

A surgical operation table is required to be provided with a function of being able to freely change a height and an inclination of a table on which a patient is laid, because the surgical operation table needs to move a specific part of the patient to a position where a doctor can easily treat the specific part of the patient, and there has been conventionally known a surgical operation table provided with an elevating function and an inclining function for a table (refer to Patent Literature 1).

Casters are generally attached to the surgical operation table like this, and the surgical operation table is easily moved to a predetermined position in a room. Further, it is dangerous for the surgical operation table to move freely, so that a locking device such as a stopper is usually provided so that the casters do not rotate.

Further, there is known a method of lifting up a surgical operation table by providing rods capable of extension and contraction close to the respective casters, as the locking device, and by causing the plurality of rods to perform extension movement.

CITATION LIST

Patent Literature

Patent Literature 1: Japanese Patent Laid-Open No. 2004-73616

DISCLOSURE OF INVENTION

Technical Problem

Incidentally, the surgical operation table of this kind has a risk of overturning due to movement of the center of gravity by changing the height and inclination of the table, although the height and inclination of the table can be freely changed.

Accordingly, overturning of the surgical operation table can be prevented by properly detecting the movement of the center of gravity, but there is a request to realize prevention of overturning without performing significant design changes in order to prevent manufacture cost from soaring.

Further, when a load exceeding a load capacity of the table is applied, the load becomes the cause of breakage and failure of the surgical operation table, so that it is necessary to measure the load which is applied to the surgical operation table accurately.

Thus, in order to solve an example of the problem like this, the present application has an object to provide medical device capable of properly measuring a center of gravity and a load that is applied to a surgical operation table, and capable of preventing overturning of the surgical operation table, failure due to overweight and the like, without performing a significant design change.

Solution to Problem

In order to solve the above described problem, medical device (S) according to claim 1 is medical device including a plurality of leg portions (20) that lift up a main body (2) from a floor surface and support the main body, and includes a load detection means (56) that is provided between the main body and each of the leg portions, and detects a load in a vertical direction that is received by the leg portion from the floor surface.

Further, the medical device according to claim 2 is the medical device according to claim 1, wherein the leg portion includes a caster (22) capable of moving the main body.

Further, the medical device according to claim 3 is the medical device in claim 1, wherein the leg portion includes a caster capable of moving the main body, and an extension and contraction unit (32) that brings the caster into contact with the floor surface, or lifts up the caster and the main body from the floor surface, by extending or contracting a rod (34), and the load detection means is provided between the main body and the extension and contraction unit.

Further, the medical device according to claim 4 is the medical device according to claim 3, wherein a guide (64) that is capable of moving the extension and contraction unit in the vertical direction is provided, and in a state where the caster is in contact with the floor surface and the rod is not in contact with the floor, the extension and contraction unit is held by the guide in a state where contact of the load detection means and the extension and contraction unit is broken.

Further, the medical device according to claim 5 is the medical device according to any one of claims 1 to 4, and further includes a determination means that determines a risk of overturning of the main body based on loads measured by a plurality of the load detection means.

Advantageous Effects of Invention

The load which is applied to the medical device such as a surgical operation table and the center of gravity at the time of the load being applied can be accurately measured, and the risk of overturning and the risk of failure due to overweight and the like can be communicated to the user based on the measurement result, with the simple mechanism.

BRIEF DESCRIPTION OF THE DRAWINGS

FIG. 4A and FIG. 4B show an attaching example of a load cell, FIG. 4A is an assembled state view, and FIG. 4B is an exploded perspective view.

DESCRIPTION OF EMBODIMENT

Hereinafter, a mode for carrying out the present invention will be described based on an embodiment of the present invention illustrated in the accompanying drawings. Note that in the following explanation, working oil refers to a fluid that is used as a power transmission medium in a hydraulic cylinder device. Further, a surgical operation table S of the present embodiment is a concept also including a medical examination table, a treatment table and the like for different use purposes, but is not limited to this field, and it is also possible to use the surgical operation table S in ordinary medical device having a risk of overturning.

Figure 1:
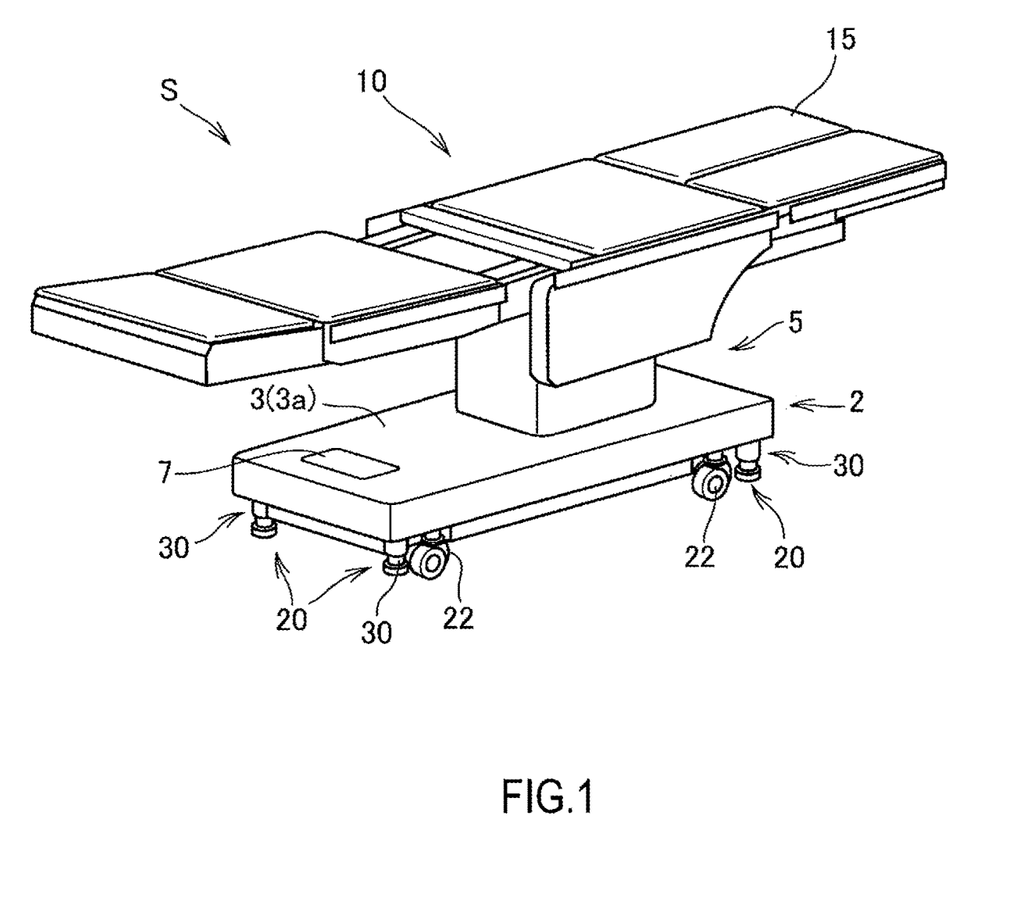
FIG. 1 is a perspective view illustrating an example of an external appearance of a surgical operation table.

As illustrated in FIG. 1, the surgical operation table S of the present embodiment includes a base 2 (a main body in the present application) that is placed on a floor of a surgical operation room, a column 5 that is raised from the base 2, and a table 10 that is provided on the column 5, for example.

The column 5 includes an extension and contraction mechanism capable of moving the table 10 in a vertical direction with respect to the base 2, and a user can adjust a height of the table 10 to a desired height by the extension and contraction mechanism.

The table 10 includes a base portion (not illustrated) that is mounted on the column 5, a movable portion (not illustrated) that moves in a horizontal direction, or tilts in a longitudinal/lateral direction with respect to the base portion, and a table main body 15 that is placed on the movable portion.

The table main body 15 is movable in an up-down direction with an extension and contraction operation of the column 5, and is capable of tilting in the longitudinal/lateral direction, or moving in a horizontal plane with movement of the movable portion. Mechanisms that cause the table main body 15 to perform these movements are provided in the movable portion and the column 5, but the mechanisms are techniques known to the public, so that explanation and illustration of the mechanisms are omitted.

Figure 2:
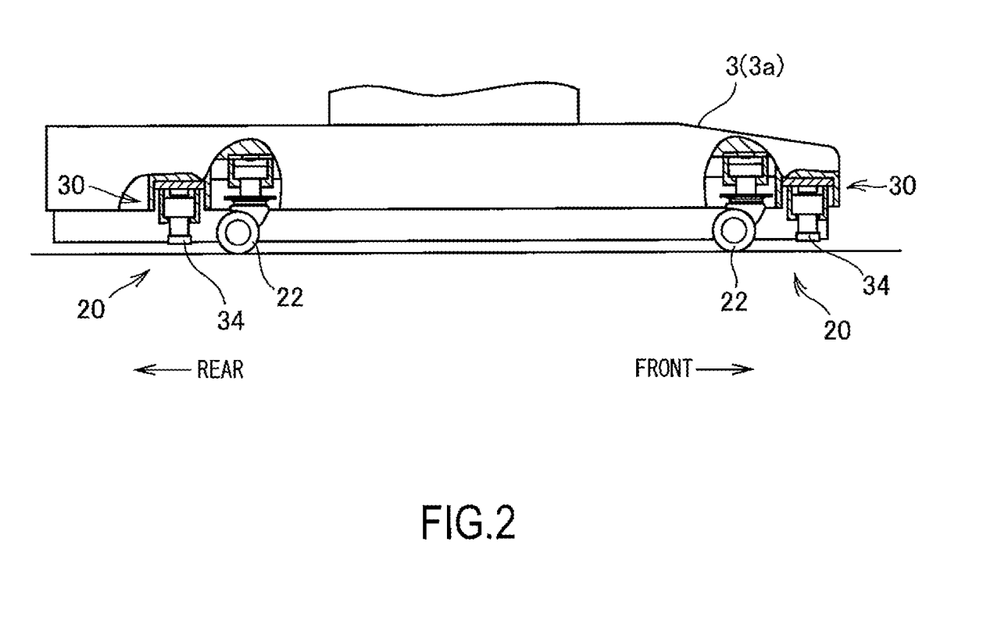
FIG. 2 is a configuration view of a base illustrating an unlocking operation example of the base by a locking device.

The base 2 includes a base main body 3, and a leg section 20 that lifts up the base main body 3 from a floor surface and support the base main body 3. In the leg section 20, a caster 22 capable of rolling on the floor surface is used as illustrated in FIG. 1 and FIG. 2, for example, and the casters 22 are provided at four corners in a front and a rear of an undersurface of the base main body 3. It is possible to move the surgical operation table S freely on the floor surface by the casters 22.

The base main body 3 has a casing 3a, a control device or the like for electrically controlling movement of the surgical operation table S is housed inside the casing 3a, and a touch panel type display body 7 for operating the surgical operation table S is provided on a surface of a rear upper portion. Further, the surgical operation table S is separately provided with a remote controller that is electrically connected to the control device, and on which buttons for electrically controlling the surgical operation table S are disposed. The user is capable of operating the surgical operation table S by using the remote controller or the display body 7.

Figure 3:
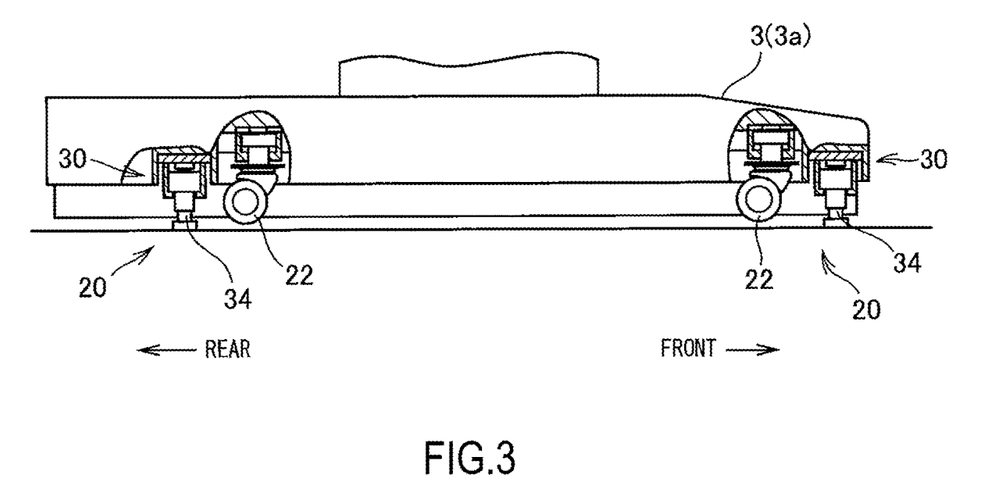
FIG. 3 is a configuration view of the base illustrating a locking operation example of the base by the locking device.
Figure 4A:
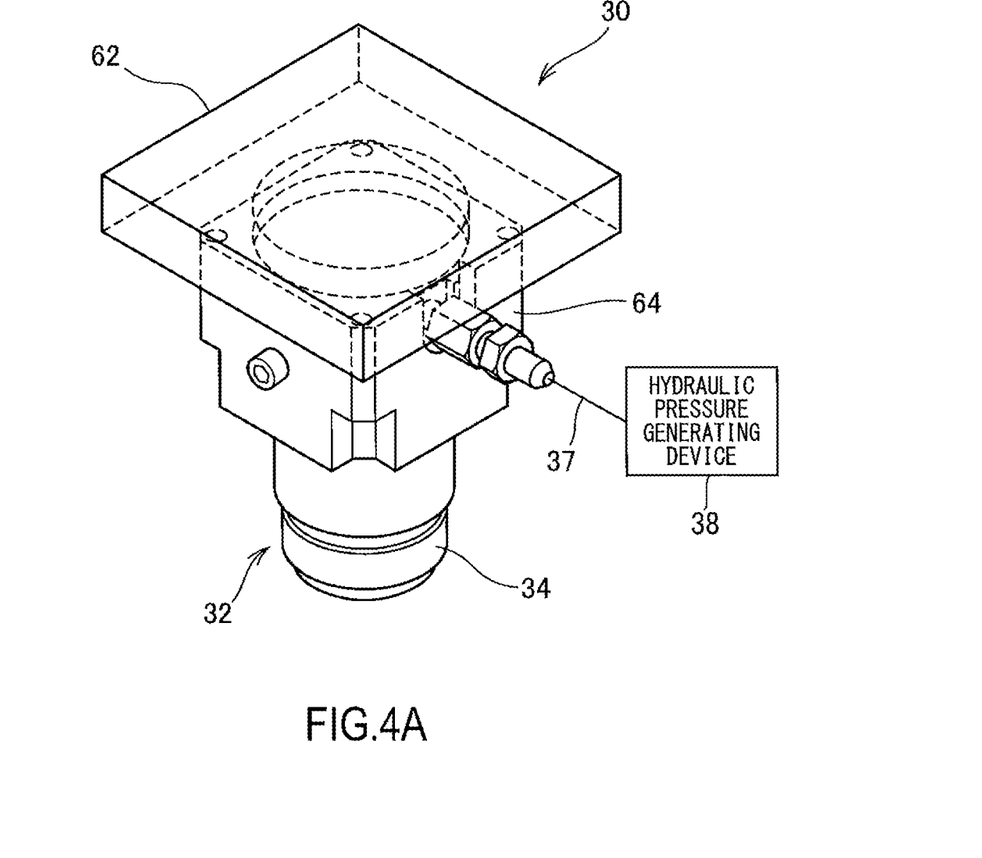

Further, as illustrated in FIG. 2 and FIG. 3, the base 2 is provided with a locking device 30 that lifts up the base 2 and separates the casters 22 from the floor surface so that the surgical operation table S does not move, and locks the surgical operation table S into a predetermined position. As illustrating in FIG. 4A, the locking device 30 includes a hydraulic unit 32 (an extension and contraction unit of the present application), and a hydraulic pressure generating device 38 that is connected to the hydraulic unit 32 via a flow path 37. Note that the locking device 30 also functions as the leg section 20 that lifts up the base 2 from the floor surface and supports the surgical operation table S instead of the caster 22.

The hydraulic unit 32 is a cylinder device of a single-acting type and a hydraulic type, for example, and includes a cylindrical cylinder main body 33 with one end closed, and a rod 34 that extends and contracts in one direction by hydraulic pressure from an open end of the cylinder main body 33, as illustrated in FIG. 4. The hydraulic unit 32 is capable of extending and contracting the rod 34 by the working oil being supplied to the cylinder main body 33 via the flow path 37 from the hydraulic pressure generating device 38, or the working oil being discharged from the cylinder main body 33 via the flow path 37, and in a locking operation of the base 2 by the locking device 30, the hydraulic unit 32 causes the rod 34 to perform an extension operation as illustrated in FIG. 5B, and in an unlocking operation of the base 2 by the locking device 30, the hydraulic unit 32 causes the rod 34 to perform a contraction operation as illustrated in FIG. 5A.

Here, "a locking operation of the base 2 by the locking device 30" is an operation of supporting the base 2 by the rod 34, and is an operation of separating the caster 22 from the floor surface with the base main body 3, and "an unlocking operation of the base 2 by the locking device 30" is an operation of separating the rod 34 from the floor surface by contracting the rod 34, and supporting the base main body 3 by the caster 22.

As illustrated in FIG. 1 to FIG. 3, the locking devices 30 are attached to an undersurface of the base main body 3 at a plurality of locations with a predetermined distribution, and specifically are disposed at four locations of the corner portions in close vicinity of the respective casters 22 included in the front side and the rear side of the base main body 3, and the rods 34 are disposed in such a manner that tip end portions thereof face the floor surface.

Figure 5A:
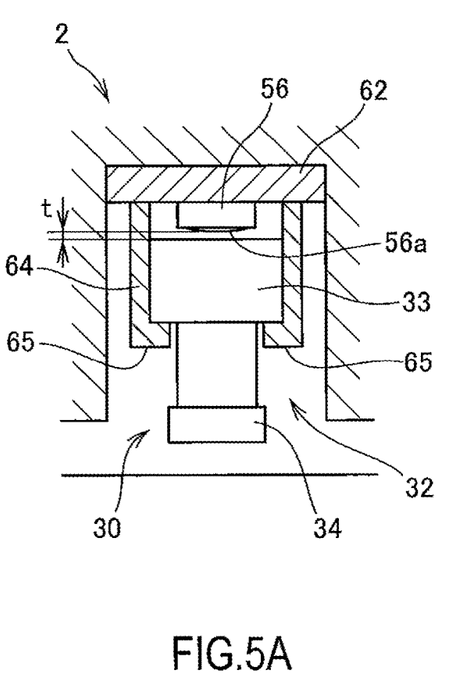
FIG. 5A and FIG. 5B are a view for explaining an operation example of a load cell in the locking or unlocking operation of the base by the locking device.
Figure 5B:
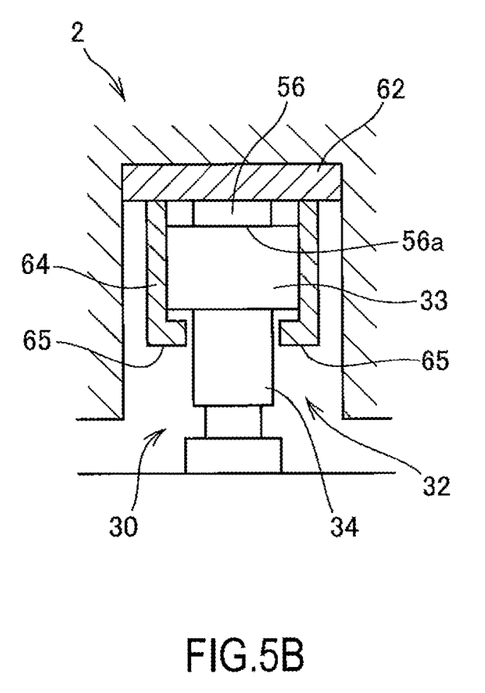

In the locking operation of the base 2 by the locking device 30, as illustrated in FIG. 3 and FIG. 5B, the rod 34 is caused to perform an extension operation in the vertical direction to press the floor surface with the rod 34, whereby the caster 22 is lifted up from the floor surface, and the base 2 is supported by the rod 34. On the other hand, in the unlocking operation of the base 2 by the locking device 30, as illustrated in FIG. 2 and FIG. 5A, the rod 34 is caused to perform a contraction operation in the vertical direction to separate the rod 34 from the floor surface, whereby the caster 22 is brought into contact with the floor surface and the base 2 is supported by the caster 22.

Figure 6:
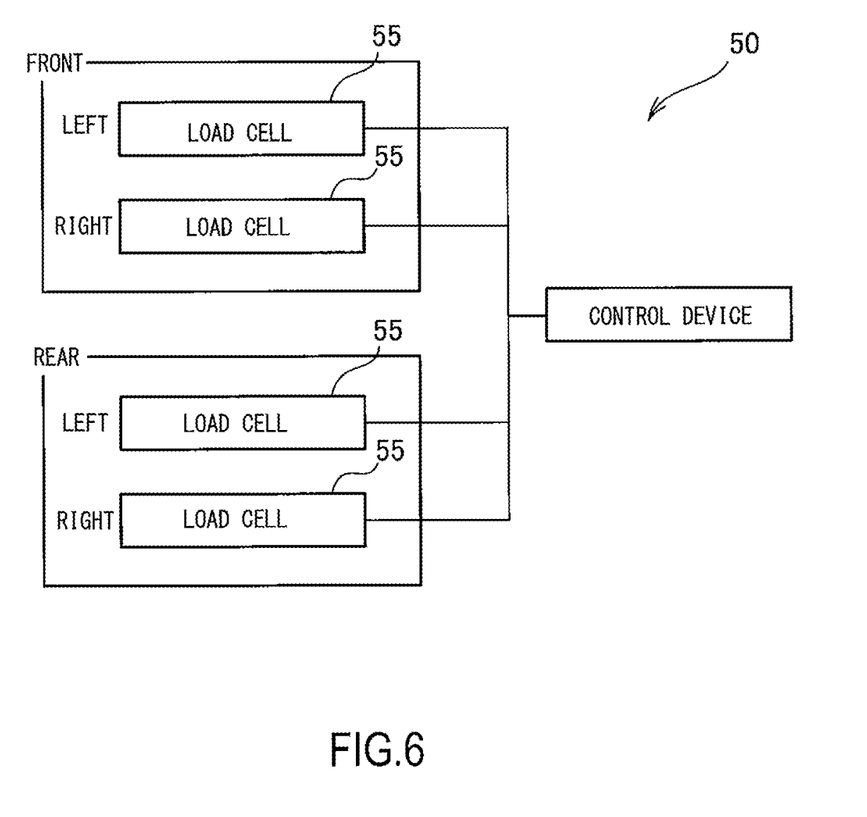
FIG. 6 is a simple system diagram of an overturning prevention device.

Further as illustrated in FIG. 6, the surgical operation table S of the present embodiment includes a risk determination device 50 that measures a load that is applied to the table 10, and determines a risk of overturning of the surgical operation table S due to movement of the center of gravity, a risk of a failure of the surgical operation table S by the load exceeding the load capacity being applied to the table 10 and the like.

The risk determination device 50 includes a plurality of load measuring instruments 55 that measure a load in the vertical direction that is received from the floor surface in the locking operation of the base 2 by the locking device 30, and a determination device (determination means of the present application) that determines a risk of failure and breakage due to over load, and a risk of overturning based on measurement results measured by the respective load measuring instruments 55.

The determination device is included in the aforementioned control device, and the control device includes a CPU (Central Processing Unit), a RAM (Random Access Memory), a ROM (Read Only Memory) and the like though not illustrated, and controls an operation of the entire surgical operation table, and functions as the determination means of the present application, by the CPU executing various programs stored in the ROM, for example. Specifically, the control device measures the loads that are applied to the respective leg portions 20, based on output signals outputted from the respective load measuring instruments 55, and determines a risk of failure and breakage by over load from the measurement values. For example, the control device measures the loads that are applied to the respective leg portions 20, and determines that there is a possibility of failure and breakage when the measurement values are larger than a specified value specified in advance, and performs sound output processing and display processing to make warning by warning sound and display.

Further, the control device determines a risk of overturning by movement of the center of gravity, measures the loads that are applied to the respective leg portions 20 based on the output signals outputted from the respective load measuring instruments 55, and determines the risk of overturning from the measurement values. The control device obtains the loads that are applied to the respective leg portions 20 on the front and rear, determines that there is the risk of overturning to the other side when a load on either one of the front and rear is smaller than a predetermined threshold A that is set in advance, and performs sound output processing and display processing to make warning by warning sound and display, for example.

Figure 4B:
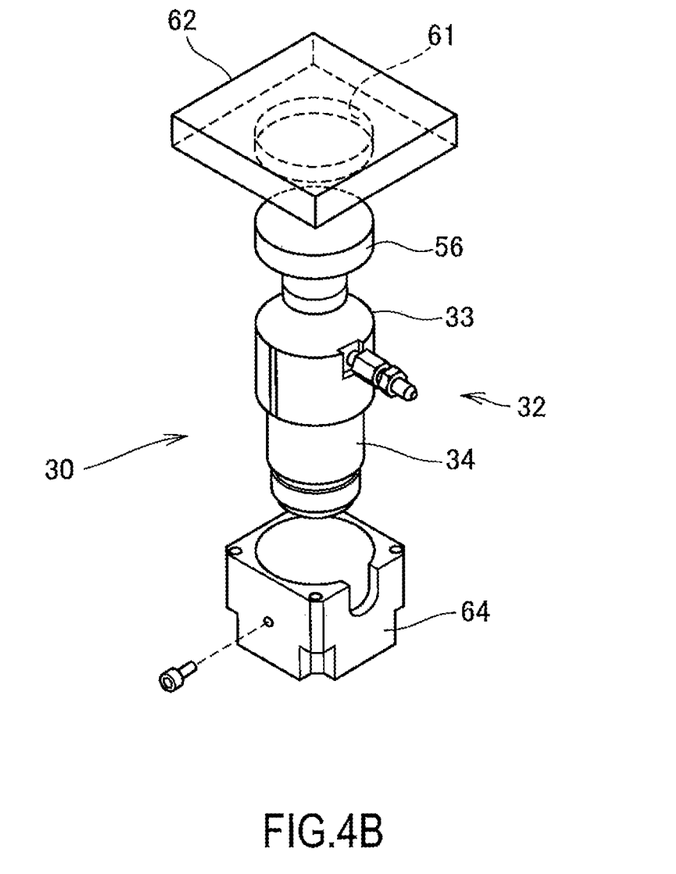

As the load measuring instrument 55, for example, a compression type load cell 56 is used, as illustrated in FIG. 4B and FIGS. 5A AND 5B. The load cell 56 has an outer shape formed into a circular column shape, and has a circular working region 56a where a load is detected, in a substantially center portion of a surface on one side, for example. The load cell 56 is disposed between the base 2 and the locking device 30, and a load that is applied in the vertical direction to the working region 56a at a time of extension operation of the rod 34 is measured.

As illustrated in FIG. 4B, the load cell 56 is held with the working region 56a facing downward by a base seat 62 where a recessed portion 61 that holds the road cell 56 is formed in a central portion. Further, the hydraulic unit 32 is held to be slidable in the vertical direction by a holder 64.

As illustrated in FIGS. 5A AND 5B, the holder 64 has a space portion that houses the hydraulic unit 32 inside, includes engaging bodies 65 that engage with a lower end edge portion of the cylinder main body 33 of the hydraulic unit 32, at a lower end, and prevents falling of the cylinder main body 33. The holder 64 has a shape designed to have a predetermined gap t between the cylinder main body 33 and the load cell 56 as illustrated in FIG. 5A in the unlocking operation of the base 2 by the locking device 30, and is fixed to the base seat 62. An upper end surface of the cylinder main body 33 is formed into a flat shape, in the locking operation of the base 2 by the locking device 30, the cylinder main body 33 moves upward by the extension operation of the rod 34 and an upper end surface thereof is brought into contact with the working region 56a of the load cell 56 as illustrated in FIG. 5B.

The hydraulic unit 32 is disposed under the load cell 56 by having the predetermined gap t and is disposed movably up and down with the center axis of the cylinder main body 33 and a center axis of the working region 56a of the load cell 56 corresponding to each other in the contraction operation of the rod 34, by the holder 64.

When the rod 34 performs an extension operation until the caster 22 separates from the floor surface in the locking operation of the base 2 by the locking device 30, the surgical operation table S configured in this way measures the load received by the rod 34 from the floor surface by the load cell 56, through the upper end surface of the cylinder main body 33 being brought into contact with the working region 56a of the load cell 56 as illustrated in FIG. 5B. At this time, the cylinder main body 33 moves upward in the vertical direction along an inner surface of the holder 64 by the holder 64, and the base 2 is lifted up in a state where the center axis of the working region 56a of the load cell 56 and the center axis of the cylinder main body 33 correspond to each other, so that forces in other directions than the vertical direction do not act on the working region 56a, and the load received from the floor surface is properly transmitted to the working region 56a. Accordingly, the load that acts on the base 2 can be accurately measured.

On the other hand, when the rod 34 performs a contraction operation until the caster 22 contacts the floor surface and a tip end of the rod 34 separates from the floor surface as illustrated in FIG. 2 and FIG. 5A in the unlocking operation of the base 2 by the locking device 30, the cylinder main body 33 moves downward vertically along the inner surface of the holder 64, and has the gap t between the cylinder main body 33 and the load cell 56. Accordingly, an external force does not act on the working region 56a of the load cell 56, and it prevents occurrence of an erroneous operation by the cylinder main body 33 always contacting the working region 56a, a failure and the like due to vibration and the like at a time of moving the surgical operation table.

Further, there is the gap t between the load cell 56 and the cylinder main body 33 in the state where the base 2 is supported by the caster 22, so that the dimensional accuracy of the holder 64 does not have to be set with high precision, and surging of the production cost can be prevented. Further, even when an influence of expansion and contraction of components due to temperature change is received, the operation is hardly influenced, so that the holder 64 and the base seat 62 can be produced without considering the influences.

Note that the base seat 62 may be formed on the base 2, and is not an essential element. Further, a shape of the recessed portion 61 may be in any form as long as the recessed portion 61 can hold the load cell 56 so that the load cell 56 can not move.

Further, the holder 64 can hold the hydraulic unit 32 movably in the vertical direction by having a gap from the load cell 56 in the state where the rod 34 is contracted, and does not have to be in a shape that completely surrounds a periphery of the cylinder main body 33. Specifically, members in circular arc shapes in plan view that are divided into two may be disposed to face each other, for example.

Next, a basic operation example of the surgical operation table S will be described.

The surgical operation table S is movable by the casters 22, and is movable to a predetermined position in a surgical operation room, for example. Further, at a time of a surgical operation, in order to prevent unintended movement of the surgical operation table S, a locking operation of the base 2 by the locking device 30 is performed. Further, for the table main body 15, elevation, movement within the horizontal plane, or crosswise turn/lengthwise turn operation is performed so that a doctor easily performs treatment.

In the locking operation of the base 2 by the locking device 30, the load in the vertical direction which is received by the leg portion 20 from the floor surface is transmitted to the working region 56a of the load cell 56 by the extension operation of the rod 34, and the output signal indicating the load is outputted to the control device.

The control device obtains the loads that are applied to the respective leg portions 20 on the front and rear, based on the output signals outputted from the load cells 56 that are disposed in the respective leg portions 20, and when the load on either one of the front and rear is smaller than the predetermined threshold A which is set in advance, the control device determines that there is the risk of overturning to the other side, and performs sound output processing and display processing to make warning by warning sound and display.

Note that in the present embodiment, overturning to the front and rear is mentioned, but presence or absence of a risk of overturning as the entire surgical operation table S may be determined with overturning to the left and right also taken into consideration.

Further, a load distribution applied to the entire base 2 is obtained from the loads which are applied to the respective leg portions 20, and presence or absence of a risk of overturning may be determined.

Next, another operation example of the surgical operation table S will be described. The present operation example differs from the above described operation example in terms of preventing a failure and breakage by over load.

The surgical operation table S is movable by the casters 22, and is movable to the predetermined position in the surgical operation room, for example. At a time of a surgical operation, in order to prevent unintended movement of the surgical operation table S, a locking operation of the base 2 by the locking device 30 is performed. Further, for the table main body 15, elevation, movement within the horizontal plane, or crosswise turn/lengthwise turn operation is performed so that a doctor easily performs treatment.

In the locking operation of the base 2 by the locking device 30, the load in the vertical direction received by the leg portion 20 from the floor surface is transmitted to the working region 56a of the load cell 56 by the extension operation of the rod 34, and an output signal indicating the load is outputted to the control device.

The control device obtains the loads which are applied to the respective leg portions 20 on the front and rear based on the output signals which are outputted from the load cells 56 which are disposed in the respective leg portions 20, obtains the entire load which is applied to all the leg portions 20, determines that there is a risk of a failure and breakage due to over load when the entire load and the loads that are applied to the respective leg portions 20 are larger than a predetermined threshold B which is set in advance, and performs sound output processing and display processing to make warning by warning sound and display.

Further, a load distribution which is applied to the entire base 2 is obtained from the loads which are applied to the respective leg portions 20, it is determined whether or not there is a location having a risk of a failure and breakage due to over load, and the location having the risk may be determined.

As described above, the surgical operation table S of the present embodiment is the surgical operation table S including the plurality of leg portions 20 that lift up the base 2 on which the table 10 and the column 5 are placed from the floor surface and support the base 2, includes the load cell 56 that is provided between the base 2 and each of the leg portions 20, and detects the load in the vertical direction received by the leg portion 20 from the floor surface. The leg portion 20 includes the caster 22 capable of moving the base 2, and the hydraulic unit 32 that brings the caster 22 into contact with the floor surface, or lifts up the caster 22 and the base 2 from the floor surface by extending or contracting the rod 34. The load cell 56 is provided between the base 2 and the hydraulic unit 32, and has the gap t between the working region 56a of the load cell 56 and the hydraulic unit 32 at the time of contraction operation of the rod 34 of the hydraulic unit 32.

In the surgical operation table S like this, it is possible to move the surgical operation table S by the caster 22 by performing the contraction operation of the rod 34 of the hydraulic unit 32, and the load cell 56 is held in a state where contact of the working region 56a of the load cell 56 and the hydraulic unit 32 is cut off, so that an external force can be prevented from acting on the load cell 56.

Further, by performing the extension operation of the rod 34 of the hydraulic unit 32, the base 2 can be locked so that the surgical operation table S cannot move, the loads that act on the respective leg portions 20 supporting the base 2 are accurately measured, and from the measurement result, a risk of overturning and a risk of a failure or the like by overweight can be determined.

Figure 7:
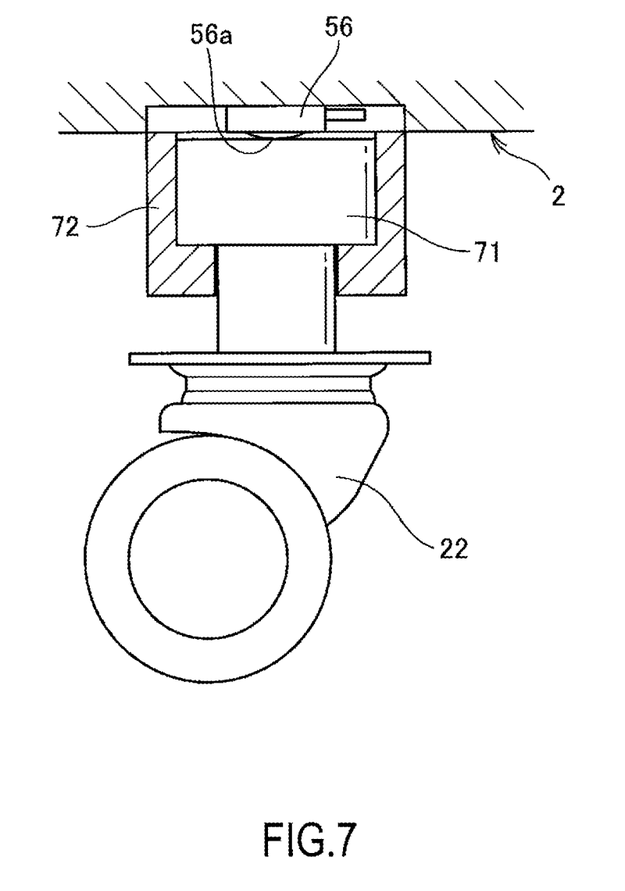
FIG. 7 is a schematic view illustrating another attaching example of the load cell.

Note that the present embodiment is only one mode, and the present invention is not limited to this mode. For example, in the present embodiment, measurement of the load by the load cell 56 is performed at the time of locking operation of the base 2 by the locking device 30 which is provided separately from the caster 22, but measurement of the load by the load cell 56 may be always performed. In this case, the load cell 56 can be provided between the caster 22 and the base 2, for example, and preferably, as illustrated in FIG. 7, a holder 72 that slidably holds a shaft 71 in the vertical direction is attached to the base 2 so that forces in other directions than the vertical direction cannot act on the working region 56a of the load cell 56, the caster 22 is provided at a lower end of the shaft 71, and the load cell 56 may be provided between the shaft 71 and the base 2.

Further, in the present embodiment, a single-acting type cylinder is used as the hydraulic unit, but it may be the leg portion 20 that is extensible and contractible so as to support the base 2 as a substitute for the caster 22, may be a mechanical type of extension and contraction device such as a pinion rack, and is not limited to a mechanical type or an electric type, and other generally known extension and contraction devices may be adopted.

Further, in the present embodiment, as the load measuring instrument, the compression type load cell is used, but the load measuring instrument is not limited to this mode, but may be in any mode as long as the instrument can measure a load by contact.

REFERENCE SIGNS LIST

S Surgical operation table
2 Base
20 Leg portion
22 Caster
32 Hydraulic unit
34 Rod
56 Load cell
64 Holder

The invention claimed is:

1. A medical device comprising:
a plurality of leg portions that lift up a main body of the medical device from a floor surface and support the main body, the plurality of leg portions comprising an extension and contraction unit comprising a rod movable in a vertical direction and a caster configured to move the main body on the floor surface; and
a load detection unit which is configured to detect a load received in the vertical direction by the plurality of leg portions from the floor surface, and which is provided between the main body and the extension and contraction unit disposed underneath the load detection unit,
wherein the extension and contraction unit is configured to bring the caster into contact with the floor surface by contracting the rod, or lift up the caster and the main body from the floor surface by extending the rod so that the rod contacts the floor surface,
wherein, when the caster is in contact with the floor surface, the extension and contraction unit is in a retracted state and the rod is not in contact with the floor surface,
wherein, in the retracted state, the extension and contraction unit is separated from the load detection unit by a gap in the vertical direction, and
wherein, in an extended state when the rod is extended, a contact between the load detection unit and the extension and contraction unit is established, and the gap between the extension and contraction unit and the load detection unit is eliminated.

2. The medical device according to claim 1, further comprising:
a guide comprising:
a hollow space provided for moving the extension and contraction unit in the vertical direction therein, and
an engaging body which extends from an outer periphery of the guide into the hollow space toward the rod at a lower end portion of the guide,
wherein the extension and contraction unit further comprises a cylinder main body which is supported at a lower end edge portion thereof by the engaging body disposed underneath the lower end edge portion of the cylinder main body,
wherein, in the extended state when the rod is extended, the extension and contraction unit is held by the guide such that a gap between the extension and contraction unit and the engaging body is formed, and
wherein, in the retracted state, the extension and contraction unit is held by the guide such that is the gap between the load detection unit and the extension and contraction unit is formed and the contact is broken.

3. The medical device according to claim 2, wherein the extension and contraction unit is capable of extending and contracting the rod by working oil.

4. The medical device according to claim 1, further comprising a determination unit that determines a risk of overturning of the main body based on loads measured by a plurality of load detection units,
wherein the load detection unit is one of the plurality of load detection units.

5. The medical device according to claim 1, wherein the extension and contraction unit is capable of extending and contracting the rod by working oil.

* * * * *